(12) United States Patent
Cheon et al.

(10) Patent No.: US 11,315,223 B2
(45) Date of Patent: Apr. 26, 2022

(54) IMAGE PROCESSING APPARATUS, IMAGE PROCESSING METHOD, AND COMPUTER-READABLE RECORDING MEDIUM

(71) Applicant: SAMSUNG ELECTRONICS CO., LTD., Suwon-si (KR)

(72) Inventors: Minsu Cheon, Suwon-si (KR); Yongsup Park, Suwon-si (KR); Changhan Kim, Suwon-si (KR); Jaeyeon Park, Suwon-si (KR); Iljun Ahn, Suwon-si (KR); Heeseok Oh, Suwon-si (KR); Tammy Lee, Suwon-si (KR); Kiheum Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/962,270

(22) PCT Filed: Jan. 24, 2019

(86) PCT No.: PCT/KR2019/000995
§ 371 (c)(1),
(2) Date: Jul. 15, 2020

(87) PCT Pub. No.: WO2019/147028
PCT Pub. Date: Aug. 1, 2019

(65) Prior Publication Data
US 2021/0065339 A1    Mar. 4, 2021

(30) Foreign Application Priority Data
Jan. 24, 2018   (KR) .................. 10-2018-0008923

(51) Int. Cl.
*G06T 5/00*    (2006.01)
*H04N 5/235*   (2006.01)

(52) U.S. Cl.
CPC .............. *G06T 5/009* (2013.01); *G06T 5/001* (2013.01); *H04N 5/2355* (2013.01); *G06T 2207/10016* (2013.01)

(58) Field of Classification Search
CPC ......... G06T 5/001; G06T 5/007; G06T 5/009; G06T 2207/10016; G06T 2207/20084;
(Continued)

(56) References Cited

U.S. PATENT DOCUMENTS 8,184,919 B2    5/2012    Ward
8,957,984 B2    2/2015    Vidal-Naquet
(Continued)

FOREIGN PATENT DOCUMENTS

CN    106846282 A    6/2017
JP    2010-231756 A    10/2010
(Continued)

OTHER PUBLICATIONS

Communication dated Oct. 29, 2020, issued by the European Patent Office in European Application No. 19744540.6.
(Continued)

*Primary Examiner* — Emily C Terrell
*Assistant Examiner* — Molly Delaney
(74) *Attorney, Agent, or Firm* — Sughrue Mion, PLLC

(57) ABSTRACT

An image processing apparatus is disclosed. The present image processing apparatus comprises: a memory for storing a low dynamic range (LDR) image and a processor for adjusting the brightness of the LDR image by means of a pixel-specific brightness ratio identified using a first parameter, and acquiring a high dynamic range (HDR) image by adding or subtracting a pixel-specific correction value identified using a second parameter in the brightness-adjusted LDR image.

15 Claims, 10 Drawing Sheets

(58) Field of Classification Search
CPC ............. G06T 2207/20208; G06T 7/90; G06T 2207/20081; G09G 5/10; G09G 5/005; H04N 5/2355

See application file for complete search history.

(56) References Cited

U.S. PATENT DOCUMENTS

| | | | |
|---|---|---|---|
| 9,330,446 | B2 | 5/2016 | Park |
| 9,607,366 | B1 | 3/2017 | Brailovskiy et al. |
| 2010/0246940 | A1 | 9/2010 | Lin |
| 2012/0201456 | A1* | 8/2012 | El-Mahdy .............. H04N 5/20 382/167 |
| 2015/0213586 | A1* | 7/2015 | Koike ................... G06T 5/007 382/284 |
| 2017/0048520 | A1* | 2/2017 | Seifi .................... H04N 19/172 |
| 2017/0054895 | A1 | 2/2017 | Wan et al. |
| 2017/0337667 | A1* | 11/2017 | Hu ........................ G06T 5/007 |
| 2017/0337670 | A1 | 11/2017 | Guermoud et al. |
| 2021/0166360 | A1* | 6/2021 | Kim ........................ G06F 17/11 |

FOREIGN PATENT DOCUMENTS

| | | |
|---|---|---|
| KR | 10-2013-0040321 A | 4/2013 |
| KR | 10-2014-0111858 A | 9/2014 |
| WO | 2017/036908 A1 | 3/2017 |

OTHER PUBLICATIONS

Gabriel Eilertsen et al., "HDR image reconstruction from a single exposure using deep CNNs", ACM Transactions on Graphics, vol. 36, No. 6, Article 178, Publication date: Nov. 2017, arXiv:1710.07480v1, Oct. 20, 2017, XP081296424, DOI: 10.1145/3130800.3130816, Total 15 pages.

Francesco Banterle et al., "High Dynamic Range Imaging and Low Dynamic Range Expansion for Generating HDR Content", Computer Graphics Forum, vol. 28, No. 8, 2009, pp. 2343-2367, XP055031838, DOI: 10.1111/j.1467-8659.2009.01541.x, Total 25 pages.

Scott Daly et al., "Decontouring: prevention and removal of false contour artifacts", Human Vision and Electronic Imaging IX, Proc. of SPIE-IS&T Electronic Imaging, SPIE, vol. 5292, 2004, pp. 130-149, XP055055075, DOI: 10.1117/12.526937, Total 20 pages.

Pavel Svoboda et al., "Compression Artifacts Removal Using Convolutional Neural Networks", arXiv:1605.00366V1, May 2, 2016, XP080698763, Total 10 pages.

P. Didyk et al., "Enhancement of Bright Video Features for HDR Displays", Eurographics Symposium on Rendering 2008, vol. 27, No. 4, 2008, XP055738158, Total 10 pages.

Yuki Endo et al., "Deep Reverse Tone Mapping", ACM Transactions on Graphics, vol. 36, No. 6, Article 177, Nov. 2017, pp. 1-10, eleven pages total.

Kshiteej Sheth, "Deep Neural Networks for HDR imaging", Indian Institute of Technology Gandhinagar, arXiv:1611.00591 v1 [cs.CV], Nov. 3, 2016, pp. 1-8, nine pages total.

Nima Khademi Kalantari et al., "Deep High Dynamic Range Imaging of Dynamic Scenes", ACM Transactions on Graphics, vol. 36, No. 4, Article 144, Jul. 2017, pp. 1-12.

Jiang Duan et al., "Learning to Display High Dynamic Range Images", Oct. 2007, six pages total.

Ana Serrano et al., "Convolutional Sparse Coding for High Dynamic Range Imaging", Computer Graphics Forum, EUROGRAPHICS, vol. 35, No. 2, arXiv:1806.04942v1 [cs.CV], 2016, twelve pages total.

Francesco Banterle et al., "Inverse Tone Mapping", Nov. 2006, nine pages total.

Xianxu Hou et al., "Deep Feature Consistent Deep Image Transformations: Downscaling, Decolorization and HDR Tone Mapping", arXiv:1707.09482v2 [cs.CV], Jul. 2017, pp. 1-12.

Zhicheng Yan et al., "Automatic Photo Adjustment Using Deep Neural Networks", ACM Transactions on Graphics, DOI 10.1145, Dec. 2014, pp. 1-15.

Jinsong Zhang et al., "Learning High Dynamic Range from Outdoor Panoramas", ICCV 2017, arXiv:1703.10200v4 [cs.CV], Oct. 2017, ten pages total.

Zheng Guo Li et al., "Detail-Enhanced Exposure Fusion", IEEE Transactions on Image Processing, vol. 21, No. 11, Nov. 2012, pp. 4672-4676, five pages total.

International Search Report dated May 13, 2019 issued by the International Searching Authority in counterpart International Application No. PCT/KR2019/000995 (PCT/ISA/210).

International Written Opinion dated May 13, 2019 issued by the International Searching Authority in counterpart International Application No. PCT/KR2019/000995 (PCT/ISA/237).

Communication dated Jan. 3, 2022 issued by the Korean Patent Office in application No. 10-2018-0008923.

\* cited by examiner

IMAGE PROCESSING APPARATUS, IMAGE PROCESSING METHOD, AND COMPUTER-READABLE RECORDING MEDIUM

TECHNICAL FIELD

The disclosure relates to an image processing apparatus, an image processing method, and a computer-readable recording medium, and more particularly, to an image processing apparatus generating an HDR image of high quality, an image processing method, and a computer-readable recording medium.

BACKGROUND ART

With the development of imaging technologies, a technology for acquiring a high dynamic range (HDR) image which exceeds the limitation of a contrast that a digital camera can express and has a wider contrast has been developed.

Specifically, following the trend that displays that can display HDR images appeared and are increasing, an inverse tone mapping operation (ITMO) technology of generating an HDR image by using a conventional LDR or SDR image is being researched.

In the conventional ITMO technology, the brightness of an entire image was expanded to a targeted brightness value, and a blending operation was performed for removing a contour artifact generated in this process. Due to this, a problem that some areas of an HDR image seem blurry occurred. Also, there was a problem that an excessive amount of operations were needed due to post processing for the continuity of the image.

Accordingly, a need for a technology for synthesizing a clear HDR image while reducing the amount of operations has arisen.

DETAILED DESCRIPTION OF THE INVENTION

Technical Problem

The disclosure is for addressing the aforementioned need, and the purpose of the disclosure is in providing an image processing apparatus, an image processing method, and a computer-readable recording medium for generating a clear HDR image while reducing the amount of operations.

Technical Solution

An image processing apparatus according to an embodiment of the disclosure includes a memory storing a low dynamic range (LDR) image, and a processor configured to adjust the brightness of the LDR image by means of a pixel-specific brightness ratio identified by using a first parameter, and acquire a high dynamic range (HDR) image by adding or subtracting a pixel-specific correction value identified by using a second parameter to or from the pixel value of the brightness-adjusted LDR image.

In this case, in the memory, an original HDR image and an LDR image for learning corresponding to the original HDR image may be stored, and the first parameter may have been learned such that the difference between the brightness of an HDR image generated by using the LDR image for learning and the brightness of the original HDR image becomes minimal.

In this case, the second parameter may have been learned such that the difference between the pixel value of an HDR image generated by using the LDR image for learning and the pixel value of the original HDR image becomes minimal.

Meanwhile, the processor may learn the first parameter in consideration of normalization of the range of the brightness value of the LDR image for learning and the range of the brightness value of the original HDR image.

Meanwhile, the processor may, based on a control command for changing the network structure being input, learn the first parameter based on a pixel-specific brightness ratio identified by using at least one multiplication operation.

Meanwhile, the processor may identify a pixel-specific correction value such that the difference of the brightness among the pixels within an area having brightness smaller than a predetermined value in the brightness-adjusted LDR image is big.

Meanwhile, the processor may identify a pixel-specific correction value such that the difference of the brightness among the pixels within an area having brightness greater than or equal to a predetermined value in the brightness-adjusted LDR image is small.

Meanwhile, the processor may perform an operation of identifying a pixel-specific brightness ratio by using the first parameter and an operation of identifying a pixel-specific correction value by using the second parameter in parallel.

Meanwhile, the processor may identify the pixel-specific brightness ratio in further consideration of adjacent pixels for each pixel of the LDR image.

Meanwhile, an image processing method according to an embodiment of the disclosure includes the steps of adjusting the brightness of the low dynamic range (LDR) image by means of a pixel-specific brightness ratio identified by using a first parameter, and acquiring a high dynamic range (HDR) image by adding or subtracting a pixel-specific correction value identified by using a second parameter to or from the pixel value of the brightness-adjusted LDR image.

In this case, the first parameter may have been learned such that the difference between the brightness of an HDR image generated by using an LDR image for learning corresponding to the original HDR image and the brightness of the original HDR image becomes minimal.

Meanwhile, the second parameter may have been learned such that the difference between the pixel value of an HDR image generated by using the LDR image for learning and the pixel value of the original HDR image becomes minimal.

Meanwhile, the first parameter may have been learned in consideration of normalization of the range of the brightness value of the LDR image for learning and the range of the brightness value of the original HDR image.

Meanwhile, the first parameter may have been learned, in case a control command for changing the network structure was input, based on a pixel-specific brightness ratio identified by using at least one multiplication operation.

Meanwhile, the pixel-specific correction value may be identified such that the difference among the pixels within an area having brightness smaller than a predetermined value in the brightness-adjusted LDR image is big.

Meanwhile, the pixel-specific correction value may be identified such that the difference of the brightness among the pixels within an area having brightness greater than or equal to a predetermined value in the brightness-adjusted LDR image is small.

Meanwhile, an operation of identifying a pixel-specific brightness ratio by using the first parameter and an operation of identifying a pixel-specific correction value by using the second parameter may be performed in parallel.

Meanwhile, the pixel-specific brightness ratio may be identified in further consideration of adjacent pixels for each pixel of the LDR image.

Meanwhile, in a computer-readable recording medium including a program for executing an image processing method according to an embodiment of the disclosure, the image processing method may include the steps of adjusting the brightness of the low dynamic range (LDR) image by means of a pixel-specific brightness ratio identified by using a first parameter, and acquiring a high dynamic range (HDR) image by adding or subtracting a pixel-specific correction value identified by using a second parameter to or from the pixel value of the brightness-adjusted LDR image.

MODE FOR IMPLEMENTING THE INVENTION

Figure 1:
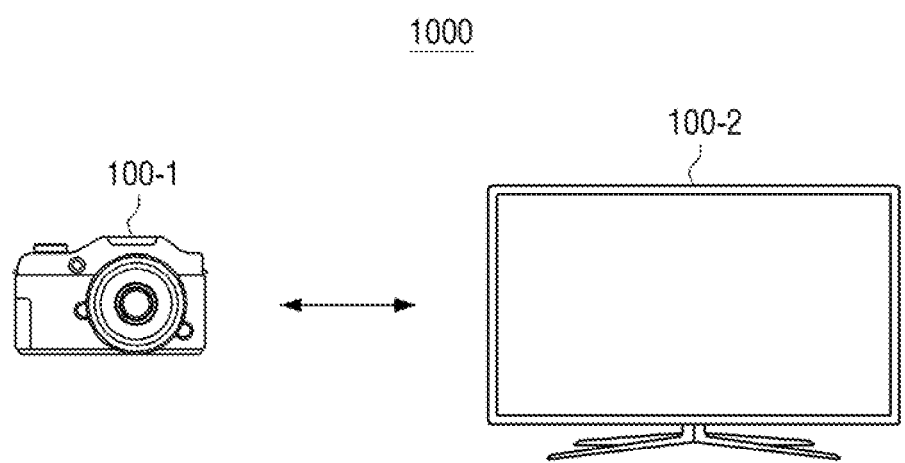
FIG. 1 is a diagram for illustrating an image processing system according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in specific cases, there are terms that were arbitrarily designated by the applicant, and in such cases, the meaning of the terms will be described in detail in the relevant descriptions of the disclosure. Thus, the terms used in the disclosure should be defined based on the meaning of the terms and the overall content of the disclosure, but not just based on the names of the terms.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Terms such as "first," "second" and the like may be used to describe various elements, but the terms are not intended to limit the elements. Such terms are used only to distinguish one element from another element.

Also, singular expressions include plural expressions, unless defined obviously differently in the context. Further, in this specification, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the embodiments of the disclosure, 'a module' or 'a part' may perform at least one function or operation, and may be implemented as hardware or software, or as a combination of hardware and software. Further, a plurality of 'modules' or 'parts' may be integrated into at least one module and implemented as at least one processor, excluding 'a module' or 'a part' that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, the disclosure will be described in more detail with reference to the accompanying drawings.

FIG. 1 is a diagram for illustrating an image processing system according to an embodiment of the disclosure.

Referring to FIG. 1, an image processing system 1000 according to an embodiment of the disclosure includes a first image processing apparatus 100-1 and a second image processing apparatus 100-2.

Specifically, the dynamic ranges of the first image processing apparatus 100-1 and the second image processing apparatus 100-2 may be different. Here, a dynamic range may mean the contrast ratio of the brightest portion and the darkest portion in a digital image, and it may be divided into a low dynamic range (LDR), a standard dynamic range (SDR), a high dynamic range (HDR), etc.

FIG. 1 illustrates a case wherein an image generated at the first image processing apparatus 100-1 which is a camera is displayed on the second image processing apparatus 100-2 which is a display apparatus as an example. However, the disclosure is not limited thereto, and each image processing apparatus may be a camera, or a display apparatus, and may include a server that can perform image processing. Alternatively, an image processing apparatus may include all apparatuses that can perform image processing such as a PC, a mobile apparatus like a smartphone, a set-top box, etc.

In case the dynamic range of the first image processing apparatus 100-1 is narrower than that of the second image processing apparatus 100-2, an HDR image for displaying a low dynamic range (LDR) image or a standard dynamic range (SDR) image generated at the first image processing apparatus 100-1 on the second image processing apparatus 100-2 of which dynamic range is wide may be generated. Meanwhile, hereinafter, images of which dynamic ranges are narrow will be generally referred to as LDR images, for the convenience of explanation.

Meanwhile, in case the dynamic range of the first image processing apparatus 100-1 is wider than that of the second image processing apparatus 100-2, an HDR image may be generated such that the detailed contrast of an image generated at the first image processing apparatus 100-1 can be displayed on the second image processing apparatus 100-2 of which dynamic range is narrow.

Here, an HDR image may be generated at the first image processing apparatus 100-1 and transmitted to the second image processing apparatus 100-2, or an image may be received at the second image processing apparatus 100-2 from the first image processing apparatus 100-1 and an HDR image may be generated. Alternatively, although not illustrated, an HDR image may be generated by using an image received at a server which is a separate external apparatus, etc. from the first image processing apparatus 100-1, and the generated HDR image may be transmitted to the second image processing apparatus 100-2.

Figure 2:
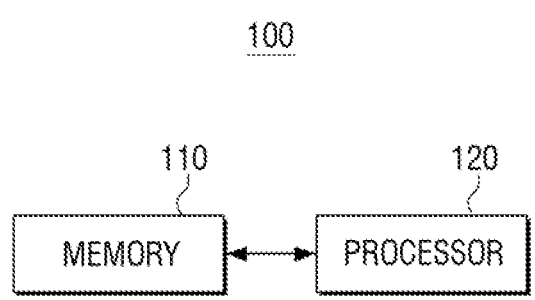
FIG. 2 is a block diagram for illustrating a schematic configuration of an image processing apparatus according to an embodiment of the disclosure.

FIG. 2 is a block diagram for illustrating a schematic configuration of an image processing apparatus according to an embodiment of the disclosure.

Referring to FIG. 2, an image processing apparatus 100 according to an embodiment of the disclosure includes a memory 110 and a processor 120.

The memory 110 may store various kinds of programs and data necessary for the operations of the image processing apparatus 100.

Specifically, the memory 110 may store an LDR image. Here, the memory 110 may store information for the dynamic range of the LDR image. Also, the memory 110 may store information for the dynamic range of an HDR image to be generated. Here, the dynamic range for the HDR image may be a dynamic range that can be displayed at the image processing apparatus 100.

Also, the memory 110 may store a plurality of parameters used in generating an HDR image. For example, the memory 110 may store parameters for identifying a brightness ratio of adjusting the brightness of an LDR image. Here, adjusting brightness may mean mapping the dynamic range of an LDR image and the dynamic range of an HDR image. Also, identifying may include meanings such as determining, calculating, extracting, generating, etc.

Here, a brightness ratio for adjusting brightness may have been identified for each pixel. Also, the memory 110 may store a parameter for identifying a correction value for performing correction for a brightness-adjusted image by using the identified brightness ratio. Here, a correction value may also have been identified for each pixel. Also, here, the stored parameter may have been learned in advance.

In addition, in the memory 110, an original HDR image for using in learning of the stored parameter and an LDR image corresponding to the original HDR image may be stored. Here, the LDR image corresponding to the original HDR image is used for learning a parameter, and it may be referred to as an LDR image for learning.

Further, the memory 110 may store a network structure for acquiring a pixel-specific brightness ratio or a pixel-specific correction value by using the stored parameter. Here, the network structure may include a deep learning structure. Also, the network structure may have been generated by a user's design. In addition, in a training set for learning parameters, the stored network structure may also be used.

The processor 120 may generate an HDR image by using a plurality of predetermined parameters and an LDR image. Specifically, the plurality of parameters may include a first parameter for identifying a ratio for adjusting the brightness of an LDR image and a second parameter for identifying a correction value that corrects the pixel value of the brightness-adjusted LDR image. Here, the first parameter and the second parameter may have been learned in advance. A training set for learning parameters will be explained below.

Meanwhile, a process of using parameters learned through a training set and acquiring result data for the data input into a learned scaling network may be referred to as a test. Specifically, if an LDR image of a test set is input, the processor 120 may generate an HDR image by using the scaling network to which the learned parameters have been applied. In other words, in actual implementation, only a test set operating with parameters learned in advance may be mounted on the image processing apparatus 100. Also, the processor 120 may identify the accuracy of the pixel value of the generated HDR image and thereby determine the performance of the scaling network.

Specifically, the processor 120 may identify a pixel-specific brightness ratio by using the first parameter. Then, the processor 120 may adjust the brightness of an LDR image by performing a multiplication operation between the LDR image and the identified pixel-specific brightness ratio, and generate an HDR image. For the convenience of explanation, it is described that each parameter is one parameter, like the first parameter and the second parameter. However, in actuality, the first parameter means a plurality of parameters used for identifying a pixel-specific brightness ratio, and the second parameter means a plurality of parameters used for identifying a pixel-specific correction value.

Meanwhile, the processor 120 may identify a pixel-specific brightness ratio in further consideration of the brightness of adjacent pixels of each pixel of an LDR image. That is, the first parameter may further include a parameter for considering the brightness of adjacent pixels. Specifically, a brightness ratio may be identified such that, even if the brightness of pixels is the same, if the brightness of adjacent pixels is dark, the brightness of a pixel is darker than a case wherein the brightness of adjacent pixels is bright. By virtue of this, compared to a conventional technology which expanded a dynamic range only based on the brightness of a pixel, an HDR image in consideration of local characteristics of an image can be generated. Also, the corresponding relation between the brightness of an LDR image and the brightness of an HDR image may have a non-linear characteristic instead of a linear characteristic. In addition, the processor 120 may adjust the brightness of an LDR image by using a pixel-specific brightness ratio, and generate an HDR image by adding or subtracting a pixel-specific correction value. Here, the pixel-specific correction value may have been identified by using the second parameter. Specifically, the processor 120 may adjust the brightness of an LDR image by using the identified pixel-specific brightness ratio, and generate an HDR image by adding or subtracting the identified pixel-specific correction value to or from the brightness-adjusted image.

Here, the processor 120 may determine an area having brightness smaller than a predetermined value within the brightness-adjusted image. Also, the processor 120 may identify a pixel-specific correction value such that the difference of the brightness among the pixels within the determined area is big. This is for, in a case wherein an edge exists in a dark area, but the difference of the brightness among the pixels is minute and thus it is difficult for a user to identify the existence of the edge, revealing the existence of the edge in the dark area by making correction such that the difference of the brightness among the pixels is big.

Meanwhile, the processor 120 may determine an area having brightness greater than or equal to a predetermined value within the brightness-adjusted image. Here, the predetermined value may be a value different from the aforementioned predetermined value for determining a dark area. Also, the processor 120 may identify a pixel-specific correction value such that the difference of the brightness among the pixels within the determined area is small. This is for, in a case wherein an edge that does not actually exist appears in an image, removing the edge, in an excessively bright area such as the sun and a light source. Specifically, this is for making correction in a case wherein the value of brightness continuously decreases as it becomes farther from the center of the point where the brightness is maximum, but it appears as if brightness decreases by stages in an image.

Here, the processor 120 may identify a pixel-specific brightness ratio and a pixel-specific correction value in parallel. Here, 'in parallel' may mean that a plurality of learning networks are used independently from one another.

Meanwhile, the processor 120 may learn a parameter in advance, and hereinafter, a training set for learning a parameter will be explained.

First, the processor 120 may learn a parameter by using an original HDR image stored in the memory 110 and an LDR image for learning corresponding to the original HDR image.

Specifically, the processor 120 may adjust brightness by applying a pixel-specific brightness ratio identified by using the first parameter to the LDR image for learning. Then, the processor 120 may generate an HDR image by adding or subtracting the pixel-specific correction value identified by using the second parameter to or from the brightness-adjusted LDR image for learning.

Then, the processor 120 may learn the first parameter and the second parameter by comparing the generated HDR image and the original HDR image.

Specifically, the processor 120 may learn the first parameter such that the difference of the brightness of the generated HDR image and the brightness of the original HDR image stored in the memory 110 becomes minimal.

Then, the processor 120 may learn the second parameter such that the difference of the pixel value of the HDR image generated by adding or subtracting the correction value and the pixel value of the original HDR image stored in the memory 110 becomes minimal. Here, the processor 120 may learn the first parameter such that the difference of the brightness of the HDR image generated by adding or subtracting the correction value and the brightness of the original HDR image becomes minimal. Here, the processor 120 may learn the first parameter in consideration of normalization of the range of the brightness value of the LDR image for learning and the range of the brightness value of the original HDR image. In the conventional technology, a normalization job for making a dynamic range coincide was essential for generating an HDR image with an LDR image. However, according to the disclosure, the processor 120 identifies a pixel-specific brightness ratio by using the first parameter in consideration of normalization, and thus an amount of operations can be reduced and an operation speed can be improved without a need for a separate normalization operation.

Here, the processor 120 may identify the first parameter and the second parameter by learning the parameters in parallel. Here, 'in parallel' may mean that a plurality of learning networks are used independently from one another.

Figure 4:
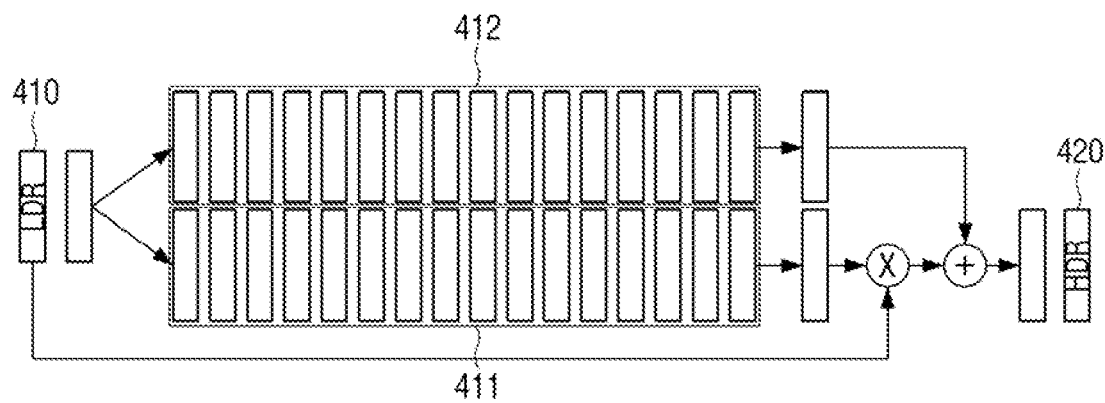
FIG. 4 is a diagram for illustrating a learning process for generating an HDR image according to the various embodiments of the disclosure.

Meanwhile, the driving operation of the processor 120 described above may be based on the network structure illustrated in FIG. 4. Such a network structure may be changed by a user's design, and various embodiments of a network structure will be described in detail with reference to FIGS. 5 to 9 below.

That is, if the network structure of the image processing apparatus 100 is as illustrated in FIG. 4, the processor 120 may identify a pixel-specific brightness ratio and a pixel-specific correction value in parallel, and generate an HDR image by using a multiplication operation and an addition operation of one time.

Meanwhile, according to a user's design, if a control command for changing a network structure is input, the processor 120 may generate an HDR image by using at least one multiplication operation and at least one addition operation. Specifically, the processor 120 may learn a parameter based on a changed network structure, and generate an HDR image by using the learned parameter.

As described above, by performing a multiplication operation by using a learned brightness ratio, and performing local correction by using a learned correction value, a clear HDR image can be generated while minimizing the amount of operations. Meanwhile, by identifying a parameter through learning, an affluent dynamic range of the level of an HDR photographed image can be expressed only with a single LDR image already photographed.

Figure 3:
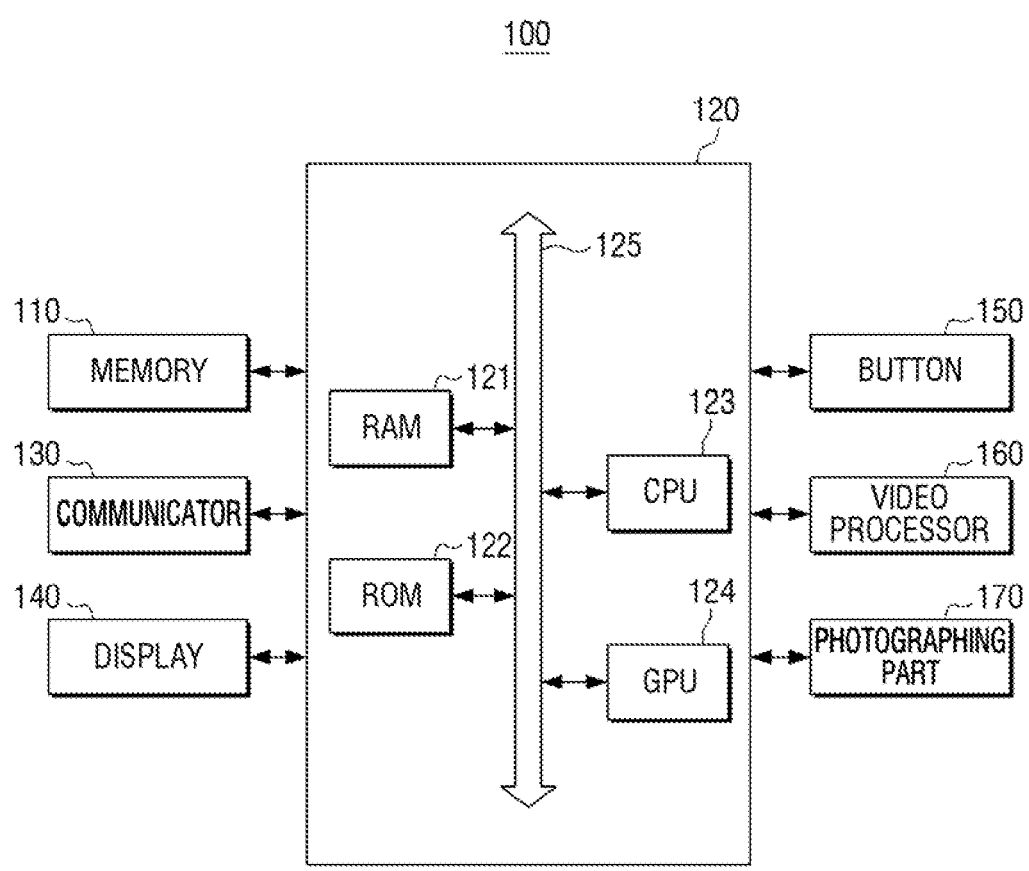
FIG. 3 is a block diagram for illustrating a detailed configuration of an image processing apparatus according to an embodiment of the disclosure.

FIG. 3 is a block diagram for illustrating a detailed configuration of an image processing apparatus according to an embodiment of the disclosure.

Referring to FIG. 3, the image processing apparatus 100 may include a memory 110, a processor 120, a communicator 130, a display 140, a button 150, a video processor 160, and a photographing part 170. Here, the memory 110 and the processor 120 are identical to the components illustrated in FIG. 2, and thus overlapping descriptions will be omitted.

First, the processor 120 may include a RAM 121, a ROM 122, a CPU 123, a graphic processing unit (GPU) 124, and a bus 125. The RAM 121, the ROM 122, the CPU 123, and the graphic processing unit (GPU) 124 may be connected with one another through the bus 125.

The CPU 123 accesses the memory 110, and performs booting by using the O/S stored in the memory 110. Then, the CPU 123 performs various operations by using various kinds of programs, contents, data, etc. stored in the memory 110.

The ROM 122 stores a set of instructions, etc. for system booting. When a turn-on instruction is input and power is supplied, the CPU 123 copies the O/S stored in the memory 110 in the RAM 121 according to the instruction stored in the ROM 122, and boots the system by executing the O/S. When booting is completed, the CPU 123 copies various kinds of programs stored in the memory 110 in the RAM 121, and performs various kinds of operations by executing the programs copied in the RAM 121.

When booting of the image processing apparatus 100 is completed, the GPU 124 displays a UI on the display 140. Specifically, the GPU 124 may generate a screen including various objects like icons, images, and texts by using an operation part (not shown) and a rendering part (not shown). The operation part operates attribute values such as coordinate values, shapes, sizes, and colors by which each object will be displayed according to the layout of the screen. Also, the rendering part generates screens in various layouts including objects, based on the attribute values operated at the operation part. The screens (or user interface windows) generated at the rendering part are provided to the display 140, and are respectively displayed in a main display area and a sub display area.

The communicator 130 is a component performing communication with various types of external apparatuses according to various types of communication methods. Specifically, the communicator 130 may receive an LDR image or an SDR image from an external apparatus. Here, the processor 120 may generate an HDR image by using the dynamic ranges of the received LDR image and the image processing apparatus 100 stored in the memory 110.

Alternatively, the communicator 130 may receive the dynamic range of an external display apparatus from the external display apparatus. Here, the processor 120 may generate an HDR image by using the dynamic ranges of the LDR image and the received external display apparatus. Then, the communicator 130 may transmit the generated HDR image to an external apparatus like a display apparatus.

Specifically, the communicator 130 may receive input of an image from an external apparatus through a wired manner such as an antenna, a cable, and a port, or receive input of an image through a wireless manner such as Wi-Fi and Bluetooth. Meanwhile, in actual implementation, the image processing apparatus 100 may receive input of an image selected by a user among a plurality of images stored in the memory 110 provided in the image processing apparatus 100 and perform image processing.

In case the image processing apparatus 100 can perform wireless communication, the communicator 130 may include a Wi-Fi chip, a Bluetooth chip, a wireless communication chip, and an NFC chip. Specifically, the Wi-Fi chip and the Bluetooth chip perform communication respectively by a Wi-Fi method and a Bluetooth method. In the case of using a Wi-Fi chip or a Bluetooth chip, various types of connection information such as an SSID and a session key is transmitted and received first, and connection of communication is performed by using the information, and various types of information can be transmitted and received thereafter. A wireless communication chip refers to a chip performing communication according to various communication standards such as IEEE, Zigbee, 3rd Generation (3G), 3rd Generation Partnership Project (3GPP), and Long Term Evolution (LTE). Meanwhile, an NFC chip refers to a chip that operates by a near field communication (NFC) method using a 13.56 MHz band among various RF-ID frequency bands such as 135 kHz, 13.56 MHz, 433 MHz, 860 to 960 MHz, and 2.45 GHz.

The display 140 may display an HDR image generated by the processor 120. The display 140 may be implemented as displays in various forms such as a liquid crystal display (LCD), an organic light emitting diodes (OLED) display, and a plasma display panel (PDP). In the display 140, a driving circuit that may be implemented in forms such as an a-si TFT, a low temperature poly silicon (LTPS) TFT, and an organic TFT (OTFT), and a backlight unit, etc. may also be included together. Also, the display 140 may be implemented as a flexible display.

Meanwhile, according to the various embodiments of the disclosure, the display 140 may not be provided in the image processing apparatus 100.

The button 150 may be various types of buttons such as a mechanical button, a touch pad, a wheel, etc. formed in any areas such as the front surface part or the side surface part, the mar surface part, etc. of the exterior of the main body of the image processing apparatus 100.

The video processor 160 is a component for processing contents received through the communicator 130, or video data included in the contents stored in the memory 110. At the video processor 160, various kinds of image processing such as decoding, scaling, noise filtering, frame rate conversion, resolution conversion, etc. for video data may be performed.

The photographing part 170 is a component for photographing a still image or a moving image according to control of a user. Specifically, the photographing part 170 may photograph one or more images for generating an HDR image.

Meanwhile, the photographing part 170 may include a lens, an image sensor, etc. Also, the photographing part 170 may be implemented in a plural number such as a front surface camera and a rear surface camera. Further, depending on the various embodiments of the disclosure, the photographing part 170 may not be provided in the image processing apparatus 100.

In addition, although not illustrated in FIG. 3, depending on embodiments, a USB port to which a USB connector can be connected, various external input ports for connecting with various external terminals such as a headset, a mouse, a LAN, etc., a DMB chip that receives a digital multimedia broadcasting (DMB) signal and processes the signal, an audio processor, a microphone, an audio outputter, various sensors, etc. can obviously be further included inside the image processing apparatus 100.

FIGS. 4 to 9 are diagrams for illustrating a process of generating an HDR image by using a network according to the various embodiments of the disclosure.

FIG. 4 illustrates an embodiment wherein a scaling network is designed as a linear function as a formula (1). Here, the scaling network may have been designed according to a user input.

$$HDR = A * LDR + B \quad (1)$$

Here, A may mean a brightness ratio, and B may mean a correction value.

Referring to FIG. 4, the image processing apparatus may make an input LDR image 410 pass through a convolution layer and extract a feature map, and make the extracted feature map pass through a plurality of layers and identify a value for generating an HDR image.

Specifically, the image processing apparatus may identify a brightness ratio through the first network 411 that identifies a brightness ratio by using the first parameter for identifying a brightness ratio. Also, the image processing apparatus may identify a correction value through the second network 412 that identifies a correction value by using the second parameter for identifying a correction value. Here, the image processing apparatus may operate the first network 411 and the second network 412 in parallel.

Then, the image processing apparatus may apply the brightness ratio identified by using the first network 411 to the input LDR image 410 through a multiplication operation. Specifically, for a brightness ratio, different values are identified according to the value of each pixel of the LDR image 410, and the image processing apparatus may adjust the brightness of the LDR image 410 by multiplying each pixel of the LDR image 410 with a brightness ratio corresponding to each pixel.

Next, the image processing apparatus may generate an HDR image 420 by adding or subtracting the correction value identified by using the second network 412 to or from the brightness-adjusted LDR image. Here, in case the correction value is a positive number, the above operation may be referred to as adding the correction value, and in case the correction value is a negative number, the above operation may be referred to as subtracting the correction value.

Then, the image processing apparatus may compare an HDR image generated by using an LDR image for learning corresponding to the stored original HDR image and the original HDR image and learn the first parameter of the first network 411 such that the difference between the brightness values becomes minimal. Further, the image processing apparatus may compare the stored original HDR image and the generated HDR image and learn the second parameter of the second network 412 such that the difference between the pixel values becomes minimal.

As described above, according to the disclosure, as a multiplication operation is used, a normalization process is not needed, and thus an amount of operations is reduced, and fast learning is possible. Also, as correction is performed for each pixel, local characteristics of an image are reflected, and thus generation of a clearer HDR image becomes possible.

Meanwhile, in FIG. 4, explanation was made while being limited to a case wherein the scaling network is designed as a linear function, but the scaling network may be designed as various functions according to a user's input of control commands for changing a network structure. Here, in a plurality of networks constituting the scaling network, parameters are set differently according to purposes. Thus, hereinafter, the networks will be referred to as a first network and a second network without limiting the uses of the networks.

Figure 5:
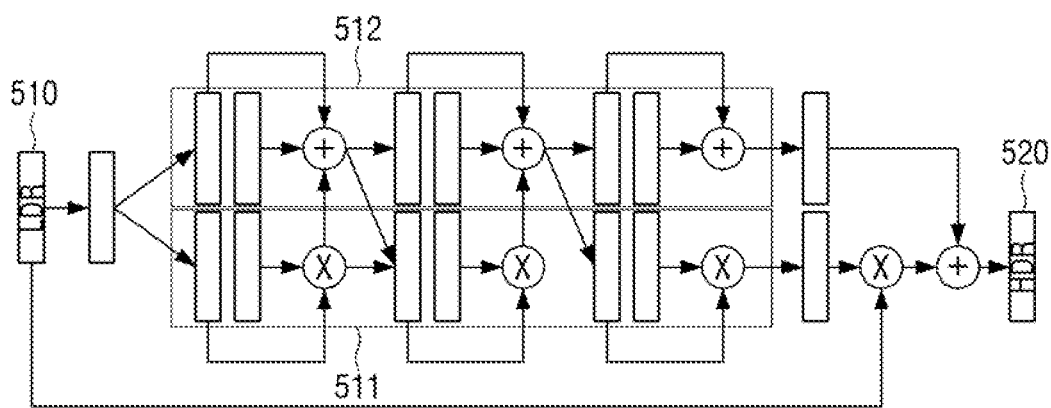
FIG. 5 is a diagram for illustrating a learning process for generating an HDR image according to the various embodiments of the disclosure.

Specifically, FIG. 5 is a diagram for illustrating an embodiment wherein a scaling network is designed as a multi-dimensional function as in a formula (2).

$$HDR = A*LDR3 + B*LDR2 + C*LDR + D \quad (2)$$

Referring to FIG. 5, the image processing apparatus may generate an HDR image 520 by using the input LDR image 510 and the scaling network.

Here, the image processing apparatus may make the input LDR image 510 pass through a convolution layer and extract a feature map, as in FIG. 4, and make the extracted feature map pass through a plurality of layers and identify a value for generating an HDR image.

Specifically, the image processing apparatus may identify the first value through the first network 511 using the first parameter for identifying a brightness ratio. Also, the image processing apparatus may identify the second value through the second network 512 using the second parameter. Here, the image processing apparatus may operate the first network 511 and the second network 512 in parallel.

Meanwhile, in FIG. 5, multiplication and addition operations may be performed inside the first network 511 and the second network 512, unlike in FIG. 4. Accordingly, in case the scaling network is a multi-dimensional function, the image processing apparatus may learn a parameter that can identify the most appropriate value for generating an HDR image 520 from the input LDR image 510.

Figure 6:
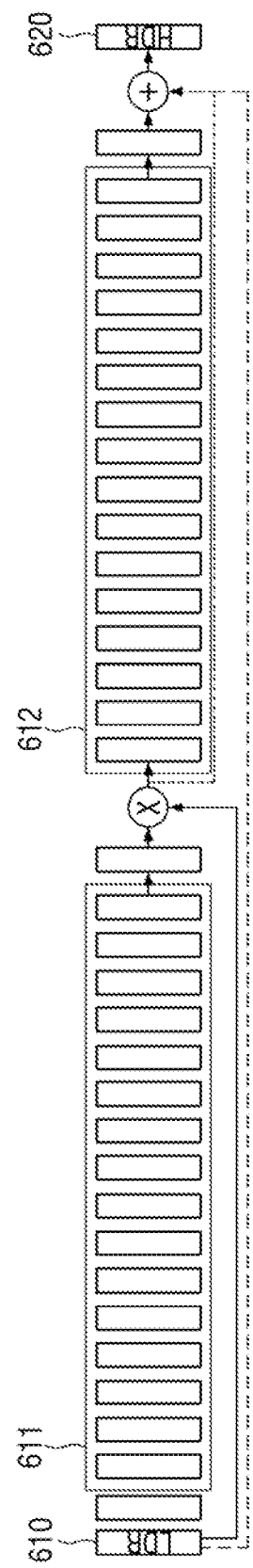
FIG. 6 is a diagram for illustrating a learning process for generating an HDR image according to the various embodiments of the disclosure.
Figure 7:
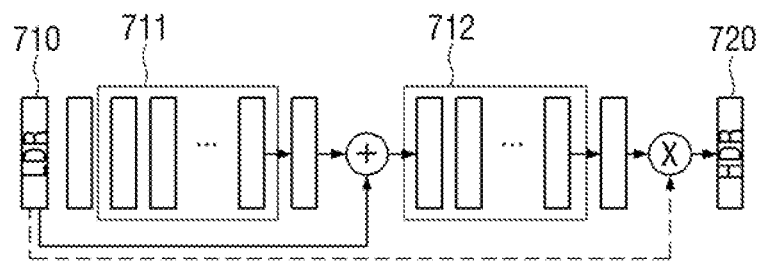
FIG. 7 is a diagram for illustrating a learning process for generating an HDR image according to the various embodiments of the disclosure.

Meanwhile, a plurality of networks constituting the scaling network may be operated in series as in FIGS. 6 and 7.

Specifically, referring to FIG. 6, the image processing apparatus may make the input LDR image 610 pass through a convolution layer and extract a feature map, and make the extracted feature map pass through a network consisting of a plurality of layers and identify a value for generating an HDR image.

Specifically, the image processing apparatus may identify the first value through the first network 611 using the first parameter. Then, the image processing apparatus may apply the identified first value to the input LDR image 610 by using a multiplication operation.

Then, the image processing apparatus may identify the second value through the second network 612 using the second value by using the feature map of the LDR image to which the first value was applied. Further, the image processing apparatus may generate an HDR image 620 by applying the identified second value to the brightness-adjusted LDR image through an addition operation.

Meanwhile, referring to FIG. 7, the image processing apparatus may make the input LDR image 710 pass through a convolution layer and extract a feature map, and make the extracted feature map pass through a network consisting of a plurality of layers and identify a value for generating an HDR image.

Specifically, the image processing apparatus may identify the first value through the first network 711 using the first parameter. Then, the image processing apparatus may apply the identified first value to the input LDR image 710 by using an addition operation.

Then, the image processing apparatus may identify the second value through the second network 712 using the second value by using the feature map of the LDR image to which the first value was applied. Further, the image processing apparatus may generate an HDR image 720 by applying the identified second value to the brightness-adjusted LDR image through an addition operation. In FIG. 4, a correction value corresponding to the second value was identified by using the feature map of the input LDR image, but in FIGS. 6 and 7, there is a difference that the second value is identified by using the feature map of the LDR image to which the first value was applied.

Figure 8:
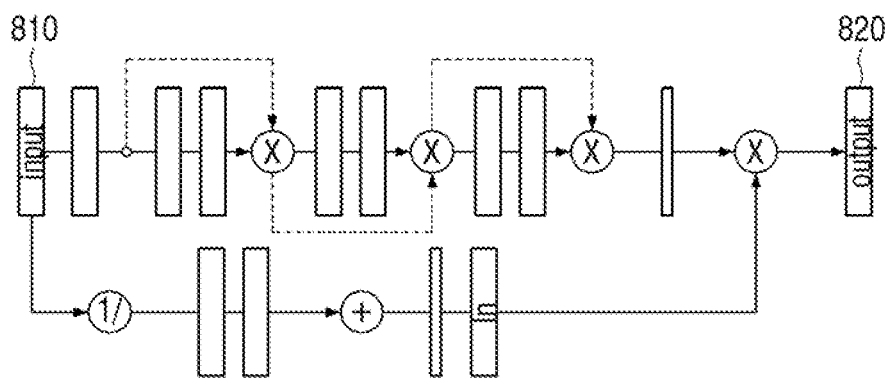
FIG. 8 is a diagram for illustrating a learning process for generating an HDR image according to the various embodiments of the disclosure.
Figure 9:
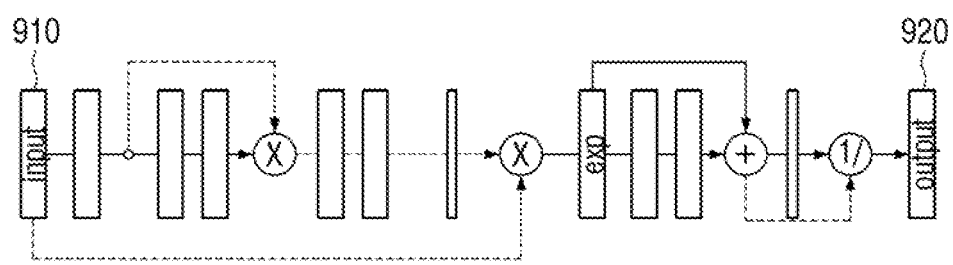
FIG. 9 is a diagram for illustrating a learning process for generating an HDR image according to the various embodiments of the disclosure.

Meanwhile, as in FIGS. 8 and 9, a scaling network may include a layer corresponding to a log function or an exponential function but not a multi-dimensional function.

FIG. 8 is a diagram for illustrating an embodiment wherein a scaling network is designed as a log function as in a formula (3).

$$output = \frac{\ln\left(\frac{1}{input} - 1\right)}{-A} \quad (3)$$

Here, A may be the first value identified by using the first network including at least one multiplication operation.

Then, referring to FIG. 8, the image processing apparatus may identify the output value 820 by applying the second value identified by using the second network to the reciprocal number of the input value 810 by using an addition operation and making the value pass through a layer taking In which is a log function and performing a multiplication operation with the first value. According to the formula (3), in FIG. 8, the second value may be −1.

FIG. 9 is a diagram for illustrating an embodiment wherein a scaling network is designed as an exponential function as in a formula (4).

$$\text{output} = \frac{1}{1 + e^{-A*input}} \quad (4)$$

Here, A may be the first value identified by using the first network including at least one multiplication operation.

Also, referring to FIG. 9, the image processing apparatus may apply the identified first value to the input value 910 through a multiplication operation and make the value pass through a layer converting the value to an exponential function of which bottom is e. Then, the image processing apparatus may identify the second value by using the value converted to an exponential function and the second network. Next, the image processing apparatus may apply the identified second value to the value converted to an exponential function by using an addition operation. Then, the image processing apparatus may take the reciprocal number of the value to which the second value was applied and identify the output value 920. According to the formula (4). In FIG. 9, the second value may be 1.

As described above, according to the disclosure, when a relation between input data is known, an optimized value can be learned.

Figure 10:
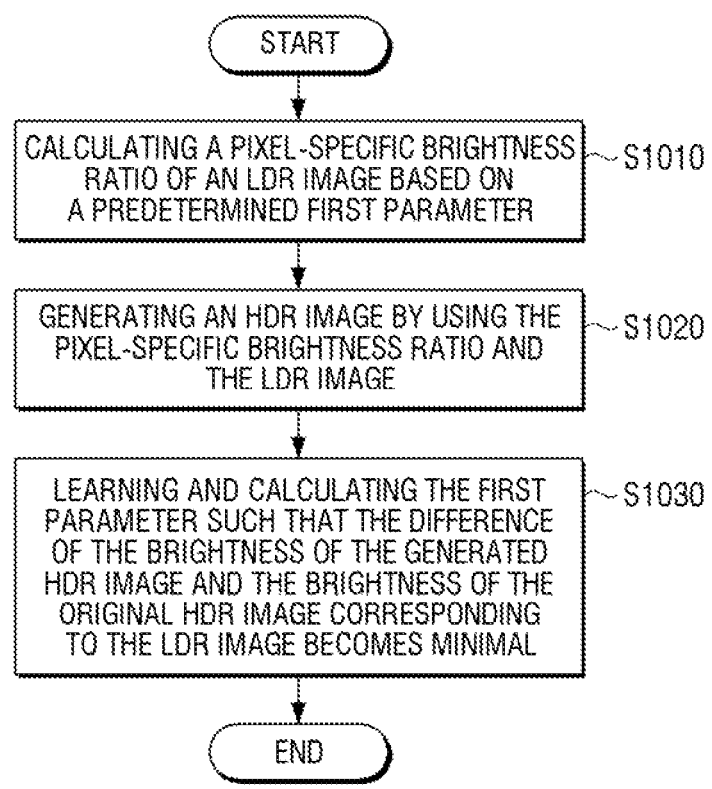
FIG. 10 is a flow chart for illustrating an image processing method according to an embodiment of the disclosure.

FIG. 10 is a flow chart for illustrating an image processing method according to an embodiment of the disclosure.

Referring to FIG. 10, the image processing apparatus may adjust the brightness of an LDR image by using a pixel-specific brightness ratio identified by using the first parameter at operation S1010. Specifically, the image processing apparatus may identify a brightness ratio for generating an HDR image for each pixel of a stored LDR image or a received LDR image by using a pre-stored first parameter. Here, the first parameter may have been learned in advance. Specifically, the first parameter may have been learned in advance by using a network having the same structure as a network included in a test set. Also, the image processing apparatus may identify a pixel-specific brightness ratio in further consideration of the brightness of adjacent pixels of each pixel of an LDR image.

Then, the image processing apparatus may add or subtract the pixel-specific correction value identified by using the second parameter to or from the pixel value of the brightness-adjusted LDR image at operation S1020. Specifically, the image processing apparatus may identify a pixel-specific correction value such that the difference of the brightness among the pixels within an area having brightness smaller than a predetermined value in the brightness-adjusted LDR image is big. Meanwhile, the image processing apparatus may identify a pixel-specific correction value such that the difference of the brightness among the pixels within an area having brightness greater than or equal to a predetermined value in the brightness-adjusted LDR image is small. Here, the second parameter may have been learned in advance. Specifically, the second parameter may have been learned in advance by using a network having the same structure as a network included in a test set. Also, the image processing apparatus may identify a brightness ratio and a correction value in parallel according to the structure of the network.

According to the various embodiments of the disclosure described above, by performing a multiplication operation by using a brightness ratio identified by using a learned parameter, and by performing local correction by using a correction value identified by using a learned parameter, a clear HDR image can be generated while minimizing the amount of operations. Meanwhile, by identifying a parameter through learning, an affluent dynamic range of the level of an HDR photographed image can be expressed only with a single LDR image already photographed.

Meanwhile, the aforementioned various embodiments of the disclosure may be implemented in a recording medium that can be read by a computer or an apparatus similar to a computer by using software, hardware or a combination thereof. According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor itself. Meanwhile, according to implementation by software, the embodiments such as procedures and functions described in this specification may be implemented as separate software modules. Each of the software modules may perform one or more functions and operations described in this specification.

Meanwhile, the image processing method according to the aforementioned various embodiments of the disclosure may be stored in a non-transitory readable medium. Such a non-transitory readable medium may be used while being mounted on various apparatuses.

A non-transitory readable medium refers to a medium that stores data semi-permanently, and is readable by machines, but not a medium that stores data for a short moment such as a register, a cache, and a memory. Specifically, programs for performing the aforementioned various methods may be provided while being stored in a non-transitory readable medium such as a CD, a DVD, a hard disk, a blue-ray disk, a USB, a memory card, a ROM and the like.

According to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. In addition, it is intended that such modifications are not to be interpreted independently from the technical idea or prospect of the disclosure.

What is claimed is:

1. An image processing apparatus comprising:
a memory storing a low dynamic range (LDR) image; and
a processor configured to:
acquire a brightness ratio corresponding to a plurality of pixels included in the LDR image by inputting the LDR image to a first network, and acquire a correction value corresponding to a plurality of pixels included in the LDR image by inputting the LDR image to a second network, wherein the first network and the second network include a convolution layer, adjust the brightness of the LDR image by multiplying a pixel value of the LDR image by the acquired brightness ratio, and acquire a high dynamic range (HDR) image by adding or subtracting the acquired correction value to or from the pixel value of the brightness-adjusted LDR image.

2. The image processing apparatus of claim 1, wherein, in the memory, an original HDR image for learning parameters corresponding to the first network and the second network and an LDR image for learning corresponding to the original HDR image are stored, and the first parameter has been learned such that the difference between a brightness of an HDR image acquired based on the LDR image for learning and a brightness of the original HDR image becomes minimal.

3. The image processing apparatus of claim 2, wherein the second parameter has been learned such that a difference between the pixel value of an HDR image acquired based on the LDR image for learning and the pixel value of the original HDR image becomes minimal.

4. The image processing apparatus of claim 2, wherein the processor is configured to:

learn the first parameter in consideration of normalization of the range of the brightness value of the LDR image for learning and the range of the brightness value of the original HDR image.

5. The image processing apparatus of claim 2, wherein the processor is configured to:

based on a control command for changing the network structure being input, learn the first parameter based on a brightness ratio identified by using at least one multiplication operation.

6. The image processing apparatus of claim 1, wherein the processor is configured to:

identify a correction value such that the difference of the brightness among the pixels within an area having brightness smaller than a predetermined value in the brightness-adjusted LDR image is big.

7. The image processing apparatus of claim 1, wherein the processor is configured to:

identify a correction value such that the difference of the brightness among the pixels within an area having brightness greater than or equal to a predetermined value in the brightness-adjusted LDR image is small.

8. The image processing apparatus of claim 1, wherein the processor is configured to:

perform an operation of identifying a brightness ratio by using the first parameter and an operation of identifying a correction value by using the second parameter in parallel.

9. The image processing apparatus of claim 1, wherein the processor is configured to:

identify the brightness ratio in further consideration of adjacent pixels for a pixel of the LDR image.

10. An image processing method, the method comprising:

acquiring a low dynamic range (LDR) image;

acquiring a brightness ratio corresponding to a plurality of pixels included in the LDR image by inputting the LDR image to a first network, and acquiring a correction value corresponding to a plurality of pixels included in the LDR image by inputting the LDR image to a second network, wherein the first network and the second network include a convolution layer, adjusting the brightness of the LDR image by multiplying a pixel value of the LDR image by the acquired brightness ratio; and acquiring a high dynamic range (HDR) image by adding or subtracting the acquired correction value to or from the pixel value of the brightness-adjusted LDR image.

11. The image processing method of claim 10, wherein the first parameter has been learned such that a difference between the brightness of an HDR image acquired based on an LDR image for learning corresponding to the original HDR image and the brightness of the original HDR image becomes minimal, wherein the original HDR image is for learning parameters corresponding to the first network and the second network.

12. The image processing method of claim 10, wherein the correction value is identified such that the difference among the pixels within an area having brightness smaller than a predetermined value in the brightness-adjusted LDR image is big.

13. The image processing method of claim 10, wherein the correction value is identified such that the difference of the brightness among the pixels within an area having brightness greater than or equal to a predetermined value in the brightness-adjusted LDR image is small.

14. The image processing method of claim 10, wherein an operation of identifying a brightness ratio by using the first parameter and an operation of identifying a correction value by using the second parameter are performed in parallel.

15. The image processing method of claim 10, wherein the brightness ratio is identified in further consideration of adjacent pixels for each pixel of the LDR image.

* * * * *